(12) United States Patent
Siess et al.

(10) Patent No.: US 9,016,094 B2
(45) Date of Patent: Apr. 28, 2015

(54) WATER COOLED OXYGEN LANCE FOR USE IN A FLOAT GLASS FURNACE AND/OR FLOAT GLASS FURNACE USING THE SAME

(71) Applicant: Guardian Industries Corp., Auburn Hills, MI (US)

(72) Inventors: Kevin Siess, Clinton Township, MI (US); David Doerschug, Canton, MI (US); Russell Parker, Madison Heights, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 93 days.

(21) Appl. No.: 13/742,535

(22) Filed: Jan. 16, 2013

(65) Prior Publication Data

US 2014/0196503 A1 Jul. 17, 2014

(51) Int. Cl.
| | |
|---|---|
| C03B 5/193 | (2006.01) |
| C03B 5/167 | (2006.01) |
| C03B 5/235 | (2006.01) |
| F23C 7/00 | (2006.01) |
| F23D 14/32 | (2006.01) |
| F27D 3/16 | (2006.01) |

(52) U.S. Cl.
CPC .............. *C03B 5/2353* (2013.01); *F23C 7/00* (2013.01); *F23D 14/32* (2013.01); *F27D 3/16* (2013.01); *C03B 2211/30* (2013.01)

(58) Field of Classification Search
CPC .............. C21C 5/4606; C21C 2300/02; C21C 2250/02; C03B 5/193; C03B 5/167; C03B 5/44; C03B 2207/86

USPC .................................. 65/134.5, 178; 266/225
See application file for complete search history.

(56) References Cited

U.S. PATENT DOCUMENTS

| | | | | |
|---|---|---|---|---|
| 3,239,324 | A * | 3/1966 | Monks, Jr. | 65/29.21 |
| 3,397,973 | A * | 8/1968 | Rough | 65/134.5 |
| 3,558,297 | A * | 1/1971 | Carney et al. | 5/134.5 |
| 3,642,060 | A * | 2/1972 | Hlinka | 165/47 |
| 3,839,017 | A * | 10/1974 | Schempp | 75/530 |
| 3,901,445 | A * | 8/1975 | Chang | 239/132.3 |
| 3,912,244 | A * | 10/1975 | Chang | 239/132.3 |
| RE28,769 | E * | 4/1976 | Rymarchyk et al. | 266/225 |
| 4,032,119 | A * | 6/1977 | Ziegler | 266/158 |
| 4,047,936 | A * | 9/1977 | Chang | 75/530 |
| 4,190,238 | A * | 2/1980 | Schoop et al. | 266/270 |
| 4,303,230 | A * | 12/1981 | Bleloch | 266/270 |
| 4,541,617 | A * | 9/1985 | Okane et al. | 266/65 |
| 4,643,403 | A | 2/1987 | Buhrmann et al. | |
| 4,702,462 | A * | 10/1987 | Fritz | 266/225 |
| 4,732,370 | A * | 3/1988 | Berry et al. | 266/270 |
| 4,865,297 | A * | 9/1989 | Gitman | 266/226 |
| 5,377,960 | A * | 1/1995 | Leczo et al. | 266/225 |
| 5,788,920 | A * | 8/1998 | Okamoto et al. | 266/225 |

(Continued)

*Primary Examiner* — Jodi C Franklin
(74) *Attorney, Agent, or Firm* — Nixon & Vanderhye P.C.

(57) ABSTRACT

A float glass furnace includes a melting furnace which heats raw materials to form a molten glass batch, a working end where the molten glass batch is cooled, at least one regenerator which introduces heated combustion air into the melting furnace through a port neck, and at least one oxygen lance in or proximate the port neck. The oxygen lance includes a lance pipe in fluid communication with the port neck, an outer shell surrounding the lance pipe, an inlet water passageway in fluid communication with a channel(s) between an exterior surface of the lance pipe and an interior surface of the outer shell, and an outlet water passageway in fluid communication with the channel(s).

11 Claims, 4 Drawing Sheets

(56) References Cited

U.S. PATENT DOCUMENTS

| | | |
|---|---|---|
| 5,906,119 A | 5/1999 | Boillet |
| 6,322,610 B1 * | 11/2001 | Pavlicevic et al. ............... 75/554 |
| 6,599,464 B1 * | 7/2003 | Feldhaus ........................ 266/87 |
| 6,705,117 B2 * | 3/2004 | Simpson et al. ............. 65/134.4 |
| 7,669,439 B2 | 3/2010 | Simpson et al. |
| 7,833,009 B2 | 11/2010 | Joshi et al. |
| 8,192,521 B2 | 6/2012 | Tateishi |
| 2006/0122450 A1 * | 6/2006 | Kim et al. ......................... 588/6 |
| 2008/0000325 A1 * | 1/2008 | Mahoney et al. ............... 75/10.4 |
| 2010/0126218 A1 * | 5/2010 | Shelestak et al. .............. 65/30.1 |

* cited by examiner

WATER COOLED OXYGEN LANCE FOR USE IN A FLOAT GLASS FURNACE AND/OR FLOAT GLASS FURNACE USING THE SAME

This application relates to a water cooled oxygen lance for use in a float glass furnace and/or a float glass furnace using the same.

BACKGROUND

Float glass is a sheet of glass made by floating molten glass on a bed of molten metal (typically molten tin often referred to as a tin bath). Raw materials (e.g., sand, sodium carbonate, dolomite, limestone, sodium sulfate, etc.) may be mixed and heated by combustion air to form molten glass before being fed onto a bath of molten metal.

The addition of oxygen or oxygen-inclusive gas to the heated combustion air increases the temperature of the glass melt and improves combustion. The oxygen or oxygen-inclusive gas may be provided by an oxygen lance.

In order to cool the oxygen lance, conventional techniques use compressed air or oxygen during a cooling period. The compressed air is provided by a compressed air line which is separate from the line used to provide oxygen or oxygen-inclusive gas. Because contamination (for example, oil contamination) in an oxygen pipeline has the potential to cause an explosion, oxygen systems are especially sensitive to oil and other contaminants. Additional equipment may be needed to provide "oil free" compressed air to the oxygen lances at additional expense. This additional equipment also requires rigorous cleaning procedures during installation at additional expense. Because of the required cleaning procedures and the risk of explosion, oxygen suppliers typically refrain from using compressed air for lance cooling.

Oxygen lances may be cooled with water. Prior art water cooled oxygen lances, however, are costly to manufacture because they require intricate machining to achieve the desired water cooling. The oxygen lance in U.S. Pat. No. 4,702,462, for example, requires three concentric tubes and six tubular nozzles.

Accordingly, there is a need for an improved oxygen lance for use in a float glass furnace and/or a float glass furnace which includes an improved oxygen lance.

SUMMARY OF EXAMPLE EMBODIMENTS

In certain example embodiments of this invention, there is provided a float glass furnace, including a melting furnace which heats raw materials to form a molten glass batch, a working end which cools the molten glass batch, at least one regenerator which introduces heated combustion air into the melting furnace through a port neck, and at least one oxygen lance in the port neck. The oxygen lance includes a lance pipe in fluid communication with the port neck, an outer shell surrounding the lance pipe, an inlet water passageway in fluid communication with a channel between an exterior surface of the lance pipe and an interior surface of the outer shell, and an outlet water passageway in fluid communication with the channel.

In certain example embodiments of this invention, there is provided an oxygen lance for use in a float glass furnace, the lance including a lance pipe in fluid communication with the port neck, an outer shell surrounding the lance pipe, an inlet water passageway in fluid communication with a channel between an exterior surface of the lance pipe and an interior surface of the outer shell, and an outlet water passageway in fluid communication with the channel.

DETAILED DESCRIPTION OF EXAMPLE EMBODIMENTS

Figure 1:
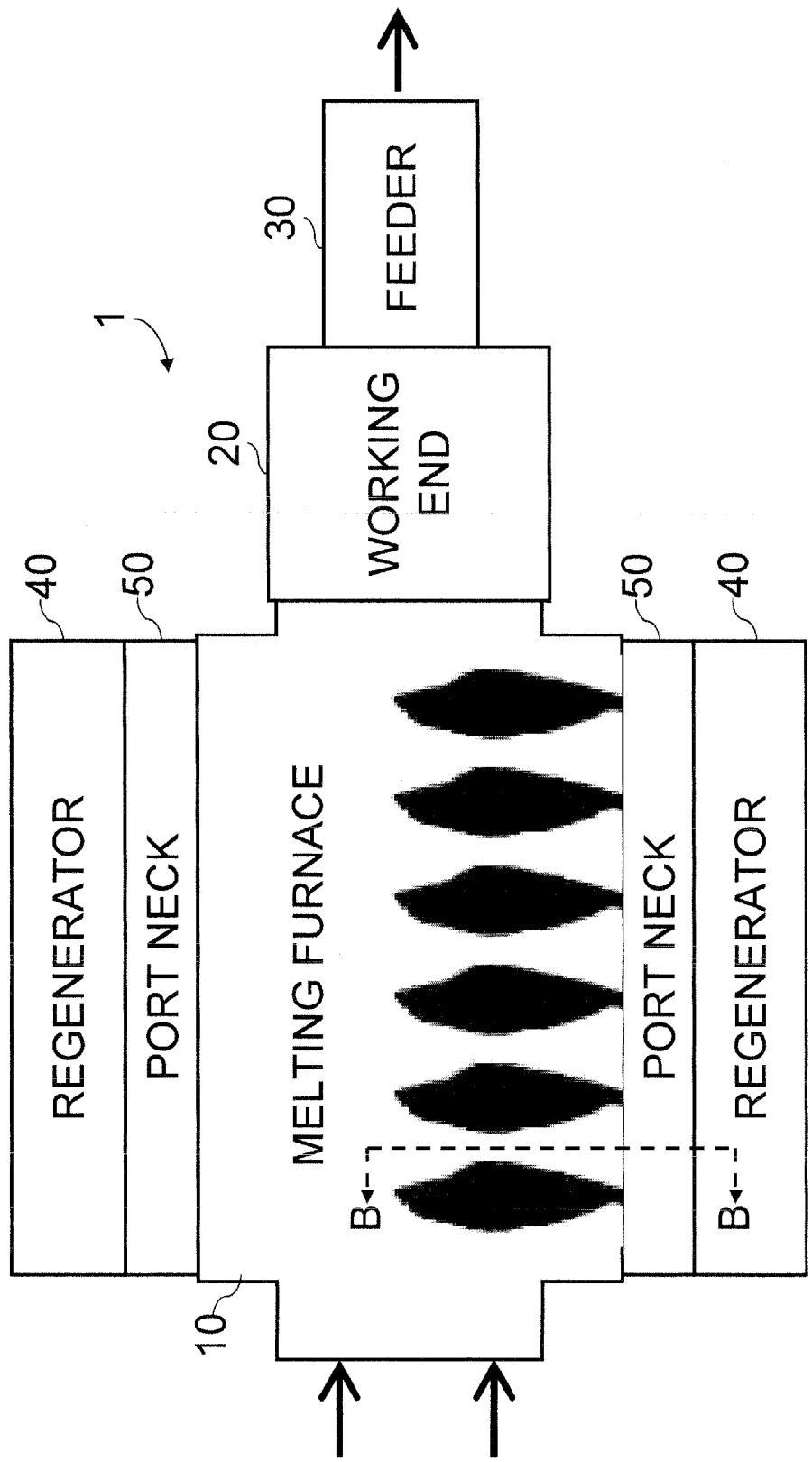
FIG. 1 is a top-down view of a float glass furnace, according to an example embodiment.

A detailed description of example embodiments is provided with reference to the accompanying drawings. Like reference numerals indicate like parts throughout the drawings.

Figure 2:
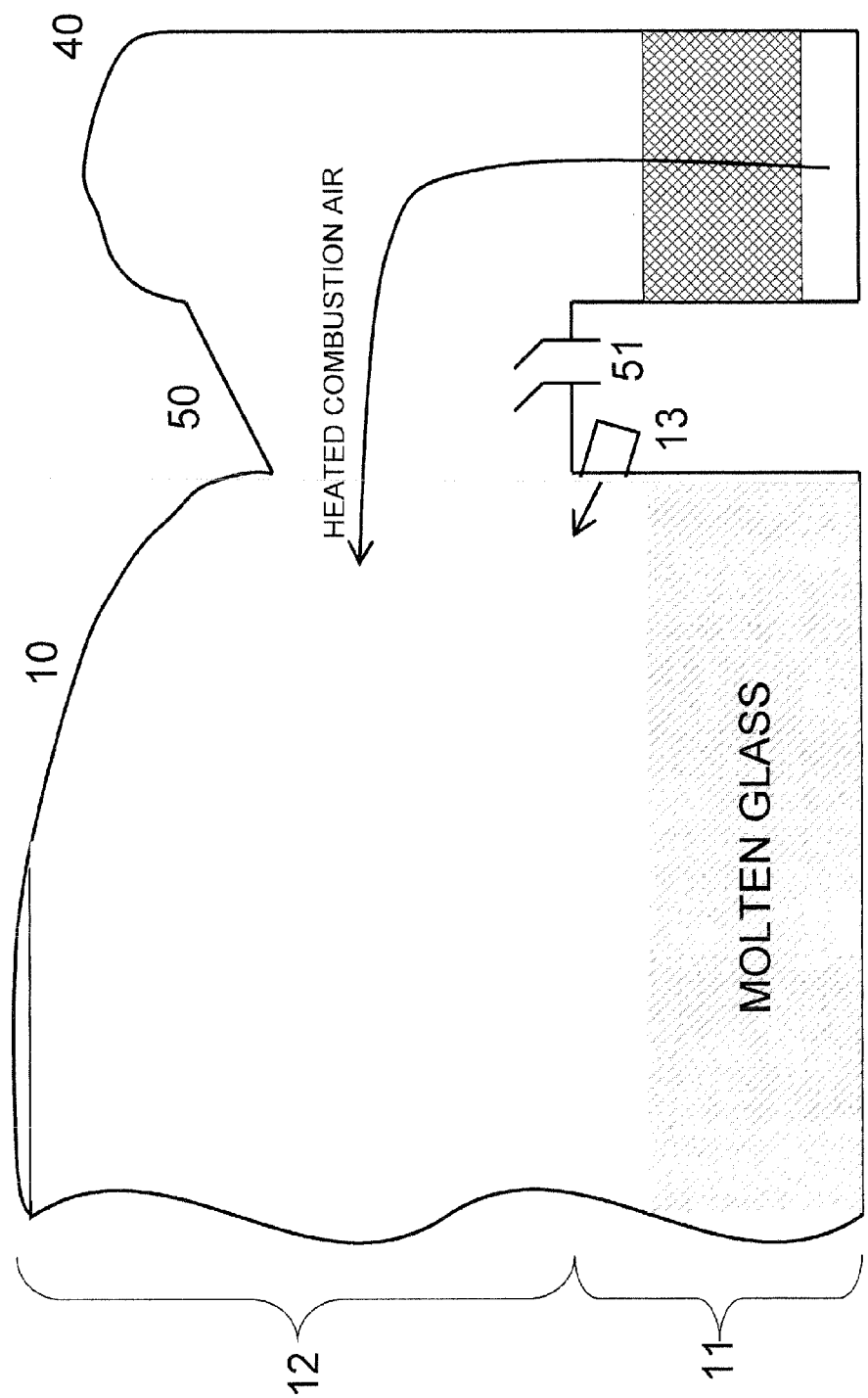
FIG. 2 is a view of cross-section B-B of the float glass furnace of FIG. 1, according to an example embodiment.

FIG. 1 is a top-down view of a float glass furnace, according to an example embodiment. FIG. 2 is a view of cross-section B-B of the float glass furnace of FIG. 1. Float glass furnace 1 may include a melting furnace 10, a working end (refiner) 20, a feeder (forehearth) 30, one or more regenerators (heat exchangers) 40, and one or more port necks 50. The molten glass may be fed from the working end 20 onto a tin bath in a known manner in making the float glass.

The melting furnace 10 may include a melting tank 11 and a superstructure 12. In the melting tank 11, raw materials are heated and homogenized to form molten glass. A melting furnace 10 may be any suitable size, for example between about 8 to 35 m in length, between about 5 to 15 m in width and between about 0.6 to 1.5 m in depth. A melting tank 11 may be of or include any suitable material, for example AZS (e.g., alumina silicate plus about 32 to 41% ZrO2). The melting furnace 10 may include a superstructure 12 above/over the melting tank 11. The superstructure 12 may be cylindrical in shape (or any other suitable shape). The materials used for the superstructure 12 depend on the technique of heating and the type of glass.

The working end 20 is situated between the melting furnace 10 and the feeder 30. In the working end 20, the molten glass cools through heat losses through the walls and/or by air blowing across the glass batch.

The feeder 30 may include one or more channels connecting the working end 20 with a spout or other type of discharge port. The glass is conditioned at the required viscosity and thermal homogeneity in the feeder. If necessary, extra heat may be delivered by gas burners or electrical heating. The feeder 30 channel(s) may be made of any suitable materials, for example refractory materials (e.g., AZS or alumina). The feeder 30 channels may be any suitable width, for example between about 50 to 120 cm. The feeder 30 channels may be any suitable depth, for example about 20-40 cm. The feeder 30 channels may be sloped to enable the required flow of molten glass toward and/or onto a tin bath.

In order to provide high enough flame temperatures to heat the raw materials and form the molten glass, a heat exchanger may be provided to pre-heat combustion air which is fed to the melting furnace 10. One type of heat exchanger is a regenerator 40.

A regenerator 40 may include channels for flue gases and combustion air (for example, a checkered work of stacked refractory bricks or a honeycomb structure of ceramic material). After flue gasses heat the honeycomb structure to a desired temperature, combustion air if fed through the channels to pre-heat the combustion air to a temperature of from about 1100 to 1300° C. After the honeycomb structure cools below the desired temperature, flue gasses are re-introduced to repeat the process. Each regenerator 40 may include a plurality of chambers.

FIGS. 1 and 2 illustrate a cross-fired float glass furnace 1, according to an example embodiment. One or more burners 13 may be situated along the side walls of melting furnace 10 which inject natural gas or fuel oil which mixes and burns with the heated combustion air to heat the molten glass.

Figure 3:
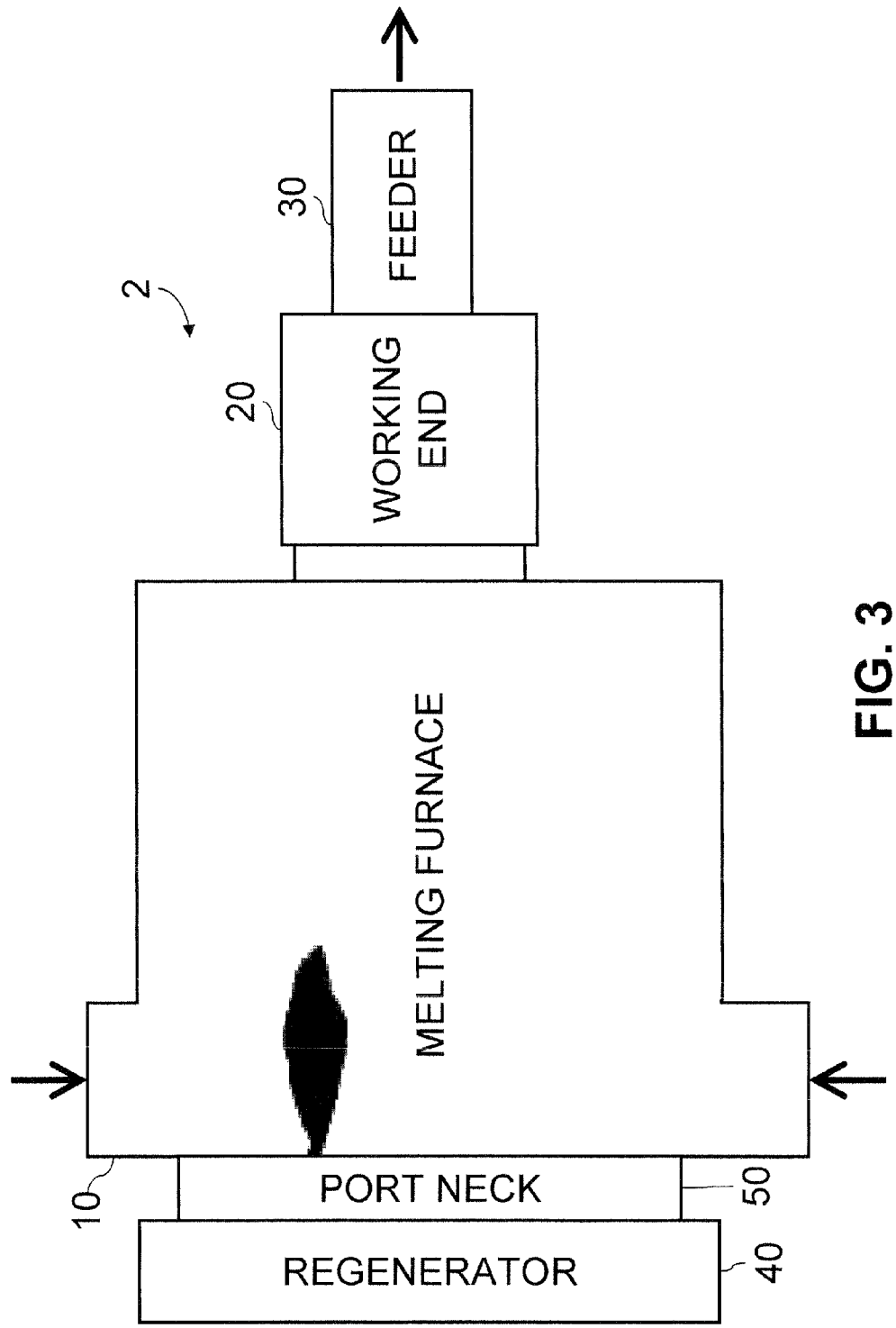
FIG. 3 illustrates an end-fired float glass furnace 2, according town example embodiment.

FIG. 3 illustrates an end-fired float glass furnace 2, according to an example embodiment. Float glass furnace 2 is similar to float glass furnace 1, except that the one or more burners 13 and the one or more regenerator 40 chambers are situated at the back wall. Raw materials to form the molten glass batch may be added at the sides of the melting furnace 10 closer to the back wall proximate the burners 13 and regenerator 40.

The float glass furnace 1 or 2 may include an even number of regenerators 40 and/or an even number of regenerator 40 chambers. One set of chambers may be heated by flue gas while the other set of chambers heats the combustion air. Each set of chambers may alternate between the process of providing heated combustion air into the melting furnace 10 ("firing") and heating the honeycomb structure ("not firing").

Heated combustion air from the regenerator 40 may be provided to the melting furnace 10 by one or more port necks 50. Oxygen or oxygen-inclusive gas may be added to the heated combustion air to increase the temperature of the glass melt and improve combustion. The oxygen or oxygen-inclusive gas may be provided by one or more oxygen lances 51 located in or proximate each port neck 50.

For example, in the event that the honeycomb structure (or checker work of stacked refractory bricks) of regenerator 40 is partially blocked, the oxygen lance 51 may introduce oxygen or oxygen-inclusive gas to supplement the combustion air stream. The oxygen lance 51 may optionally also draw exhaust gasses out of the regenerator 50.

The float glass furnace 1 or 2 may include any suitable number of oxygen lances 51, for example between 1 and about 10 lances in each port neck in certain example embodiments. The oxygen lances 51 may be situated such that each oxygen lance 51 is proximate to a chamber of the regenerator 50.

FIGS. 4(a)-4(c) illustrate a water cooled oxygen lance 51 for use in a float glass furnace (for example, for use in a float glass furnace as illustrated in any of FIGS. 1-3), according to an example embodiment.

Water cooled oxygen lance 51 includes an outer shell 53 which surrounds an inner lance pipe 52. An inlet water passageway(s) 54 is in fluid communication with a channel 55 between the exterior of the lance pipe 52 and the interior of the outer shell 53. Thus, channel 55, 56 viewed cross sectionally is located between the exterior of lance pipe 52 and the interior of outer shell 53. The interior tube/pipe 52 may have interior threads for the threading in of various different output nozzles, with oxygen to be output via such nozzle(s). Fins 58 and 59 are provided on the top and bottom of the lance pipe 52, in order to separate the channel 55, 56 into multiple sections 55 and 56 with possible different water flow directions. The fins 58 and 59 are provided along the length of the lance pipe 52, stopping short of the end of the outer shell 53 such that the channel 55 is in fluid communication with a channel 56 proximate the end of the outer shell in the area where the fin(s) are not located. The channel 56 is between the exterior of the lance pipe 52 and the interior of the outer shell 53 on the opposite side of fins 58 and 59 (when compared to the channel 55). The channel 56 is in fluid communication with an outlet water passageway 57.

Accordingly, a stream of water introduced through the inlet water passageway 53 via inlet 54 flows through channel 55 toward the right in FIG. 4(a) and then makes its way into channel 56 at the right-end of the channel and then flows through channel 56 toward the left in FIG. 4(a) and exits via outlet 57. Thus, the cooling water in channels 55, 56 substantially surrounds the lance pipe 52 through the channels 55 and 56 before exiting through the outlet water passageway 57.

Figure 4:
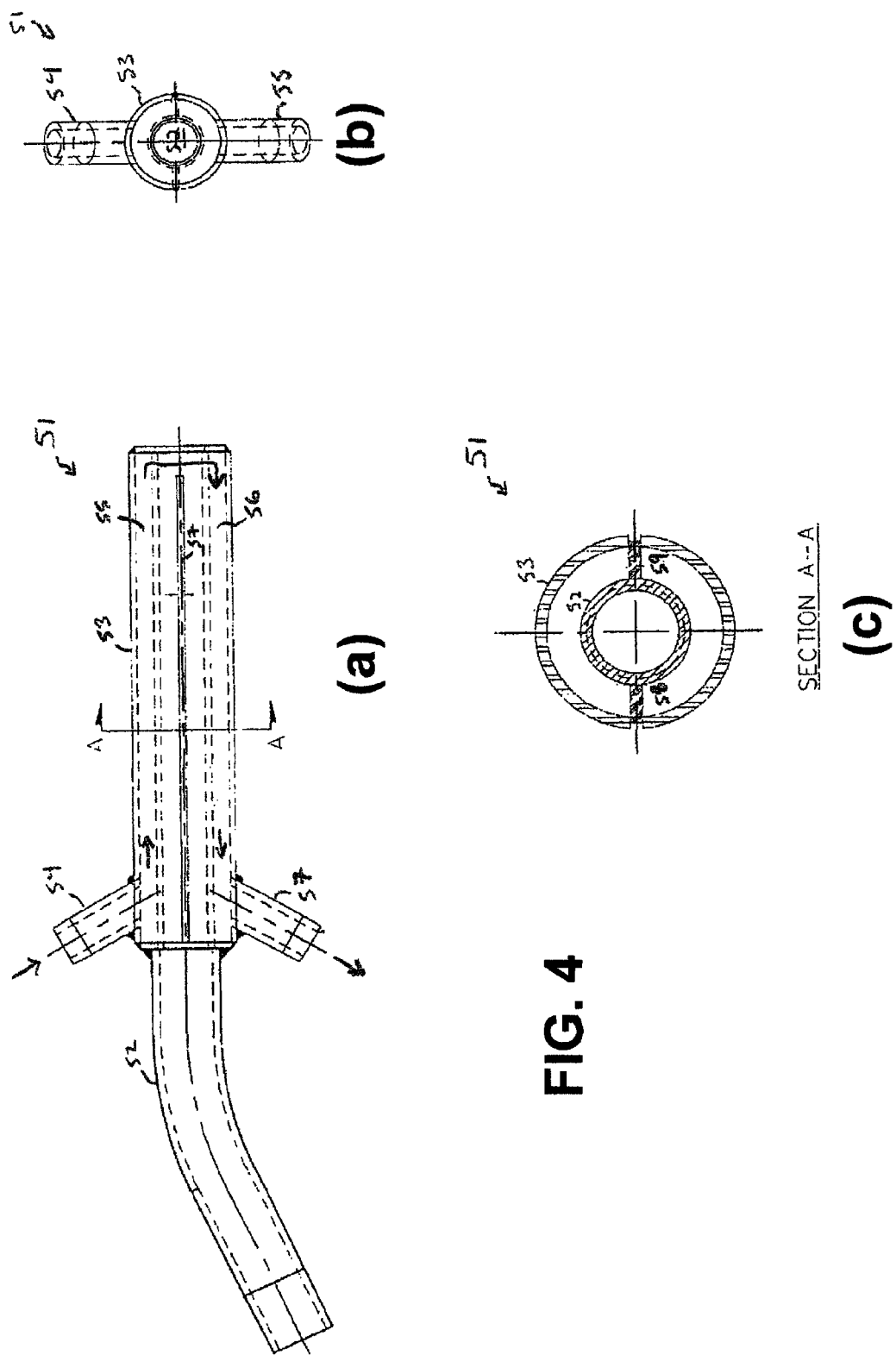
FIG. 4 illustrates a water cooled oxygen lance for use in a float glass furnace of any of FIGS. 1-3, according to an example embodiment.

The water cooled oxygen lance 51 illustrated in FIG. 4 provides cost, safety, and operational advantages to the related art cooling systems.

The water cooled oxygen lance 51 eliminates or reduces the risk of explosion from contamination in compressed air cooling systems. Accordingly, the water cooled oxygen lance 51 eliminates or reduces the need for additional equipment and cleaning procedures required for "oil free" compressed air. The cost of installation and operation of the water cooled oxygen lance 51 is minimized/reduced because the water cooled oxygen lance 51 requires minimal piping and no or little additional equipment.

In contrast with oxygen and compressed air cooled lances which are subject to temperature variation, the water cooled lance 51 operates at a more consistent temperature because the water flow can remain constant through channels 55, 56.

Additionally, the cooler operating temperature of the water cooled oxygen lance 51 allows the wall thickness of the lance itself to be decreased and the oxygen flow to be increased.

According to an example embodiment, float glass furnace 1 and/or 2 may include at least one port neck 50 connecting one or more regenerator 40 chambers with a melting furnace 10, and a plurality of water cooled oxygen lances 51 may be located inside each port neck 50. The plurality of regenerator 40 chambers may alternate between firing and not firing as described above.

When a regenerator 40 chamber is not firing, water cooling an oxygen lance 51 proximate to the non-firing regenerator 40 chamber eliminates or reduces the need to provide cooling oxygen or cooling compressed air to the oxygen lance 51 proximate to the non-firing regenerator 40.

In example embodiments of this invention, there is provided a float glass furnace, comprising: a melting furnace which heats raw materials to form a molten glass batch; a working end in which the molten glass batch can be cooled before being provided on a tin bath; at least one regenerator for introducing heated combustion air into the melting furnace through a port neck; an oxygen lance in the port neck, the oxygen lance comprising: a lance pipe in fluid communication with the port neck; an outer shell surrounding the lance pipe for introducing oxygen gas into the port neck; an inlet cooling water passageway in fluid communication with at least one cooling channel located between an exterior surface of the lance pipe and an interior surface of the outer shell; and an outlet cooling water passageway in fluid communication with the channel, where cooling water is introduced into the oxygen lance via the inlet cooling water passageway and exits the oxygen lance via the outlet cooling water passageway.

In the float glass furnace of the immediately preceding paragraph, the at least one cooling channel may substantially surround the lance pipe.

In the float glass furnace of any of the preceding two paragraphs, there may be a first fin and a second fin, the first fin and the second fin extending from the exterior surface of the lance pipe to the interior surface of the outer shell. The first fin and the second fin may be parallel to each other and may each extend lengthwise along the exterior surface of the lance pipe from a first end of the outer shell to an area proximate a second end of the outer shell opposite the first end.

In the float glass furnace of any of the preceding three paragraphs, the at least one channel may comprise a first channel portion and a second channel portion, wherein cooling water flows in a first direction in the first channel portion and in a second opposite direction in the second channel portion, the first and second channel portions being in fluid communication with each other proximate at least an end portion of the oxygen lance. The first and second channel portions may each be formed by at least the exterior surface of the lance pipe, the interior surface of the outer shell, and first and second fins extending between the exterior surface of the lance pipe and the interior surface of the outer shell.

The forgoing example embodiments are intended to provide an understanding of the disclosure to one of ordinary skill in the art. The forgoing description is not intended to limit the inventive concept described in this application, the scope of which is defined in the following claims.

What is claimed is:

1. A float glass furnace, comprising:
    a melting furnace which heats raw materials to form a molten glass batch;
    a working end in which the molten glass batch can be cooled before being provided on a tin bath;
    at least one regenerator for introducing heated combustion air into the melting furnace through a port neck;
    an oxygen lance in the port neck, the oxygen lance comprising: a lance pipe in fluid communication with the port neck; an outer shell surrounding the lance pipe for introducing oxygen gas into the port neck; an inlet cooling water passageway in fluid communication with at least one cooling channel located between an exterior surface of the lance pipe and an interior surface of the outer shell; and an outlet cooling water passageway in fluid communication with the channel, where cooling water is introduced into the oxygen lance via the inlet cooling water passageway and exits the oxygen lance via the outlet cooling water passageway;
    wherein the at least one channel comprises a first channel portion and a second channel portion, wherein cooling water flows in a first direction in the first channel portion and in a second opposite direction in the second channel portion, the first and second channel portions being in fluid communication with each other proximate at least an end portion of the ox en lance; and
    wherein the first and second channel portions are each formed by the exterior surface of the lance pipe, the interior surface of the outer shell, and first and second fins extending between the exterior surface of the lance pipe and the interior surface of the outer shell.

2. The float glass furnace of claim 1, wherein the at least one cooling channel substantially surrounds the lance pipe.

3. The float glass furnace of claim 1, further comprising a first fin and a second fin, the first fin and the second fin extending from the exterior surface of the lance pipe to the interior surface of the outer shell.

4. The float glass furnace of claim 3, wherein the first fin and the second fin are parallel to each other and each extend lengthwise along the exterior surface of the lance pipe from a first end of the outer shell to an area proximate a second end of the outer shell opposite the first end.

5. The float glass furnace of claim 1, wherein the at least one channel comprises a first channel portion and a second channel portion, wherein cooling water flows in a first direction in the first channel portion and in a second opposite direction in the second channel portion, the first and second channel portions being in fluid communication with each other proximate at least an end portion of the oxygen lance.

6. An oxygen lance for use in a float glass furnace, the oxygen lance comprising:
    a lance pipe in fluid communication with a port neck;
    an outer shell surrounding the lance pipe;
    an inlet water passageway in fluid communication with a water cooling channel between an exterior surface of the lance pipe and an interior surface of the outer shell;
    an outlet water passageway in fluid communication with the channel; and
    wherein the channel comprises a first channel portion and a second channel portion, wherein cooling water flows in a first direction in the first channel portion and in a second opposite direction in the second channel portion, the first and second channel portions being in fluid communication with each other proximate at least an end portion of the oxygen lance.

7. The lance of claim 6, wherein the channel substantially surrounds the lance pipe.

8. The lance of claim 6, wherein the first and second channel portions are each formed by at least the exterior surface of the lance pipe, the interior surface of the outer shell, and first and second fins extending between the exterior surface of the lance pipe and the interior surface of the outer shell.

9. An oxygen lance for use in a float glass furnace, the oxygen lance comprising:
    a lance pipe in fluid communication with a port neck;
    an outer shell surrounding the lance pipe;
    an inlet water passageway in fluid communication with a water cooling channel between an exterior surface of the lance pipe and an interior surface of the outer shell;
    an outlet water passageway in fluid communication with the channel; and
    a first fin and a second fin, the first fin and the second fin extending outwardly from the exterior surface of the lance pipe to the interior surface of the outer shell.

10. The lance of claim 9, wherein the channel comprises a first channel portion and a second channel portion, wherein cooling water flows in a first direction in the first channel portion and in a second opposite direction in the second channel portion, the first and second channel portions being in fluid communication with each other proximate at least an end portion of the oxygen lance.

11. The lance of claim 9, wherein the channel substantially surrounds the lance pipe.

* * * * *